United States Patent [19]

Flodin et al.

[11] Patent Number: 4,762,867

[45] Date of Patent: Aug. 9, 1988

[54] CEMENT MORTAR AND CONCRETE WITH A REDUCED WATER ABSORPTION AND A METHOD FOR MANUFACTURE THEREOF

[75] Inventors: Per Flodin, Hovås; Olof Magnusson, Lerum; Satish Chandra, Gothenburg, all of Sweden

[73] Assignee: Polyrand AB, Sovas, Sweden

[21] Appl. No.: 37,055

[22] Filed: Apr. 13, 1987

Related U.S. Application Data

[63] Continuation of Ser. No. 668,150, Nov. 5, 1984, abandoned.

[30] Foreign Application Priority Data

Nov. 3, 1983 [SE] Sweden ............................ 8306039

[51] Int. Cl.$^4$ .............................................. C08K 3/00
[52] U.S. Cl. .......................................... 524/5; 524/555; 524/560; 524/561
[58] Field of Search ............................................. 524/5

[56] References Cited

U.S. PATENT DOCUMENTS

| | | | |
|---|---|---|---|
| 3,256,229 | 6/1966 | Janota et al. | 524/5 |
| 3,382,139 | 5/1968 | Popkin et al. | 524/5 |
| 3,806,571 | 4/1974 | Rönnmark et al. | 524/5 |
| 3,936,311 | 2/1976 | Kirst et al. | 524/5 |
| 3,947,398 | 3/1976 | Williams | 524/5 |
| 4,043,827 | 8/1977 | Bernett | 524/5 |
| 4,197,225 | 4/1980 | Emmons et al. | 524/832 |

*Primary Examiner*—Joseph L. Schofer
*Assistant Examiner*—Bernard Lipman
*Attorney, Agent, or Firm*—Cushman, Darby & Cushman

[57] ABSTRACT

A cement mortar and concrete having a reduced water absorption and with a density of 2000-2500 kg/m$^3$, at which it calculated on the amount of cement contains 0.2-10% by weight of a polymer in dispersion form consisting of polymeric particles containing hydropholic monomers from one or more of the groups acrylic monomers, methacrylic monomers and styrene and 1-15% calculated on the total amount of monomers of a methacrylate having an aliphatic chain of 12 or more carbons, preferably stearyl methacrylate.

9 Claims, No Drawings

CEMENT MORTAR AND CONCRETE WITH A REDUCED WATER ABSORPTION AND A METHOD FOR MANUFACTURE THEREOF This is a continuation of application Ser. No. 668,150, filed Nov. 15, 1984, which was abandoned upon the filing hereof.

BACKGROUND OF THE INVENTION

The present invention refers to admixture of a hydrophobic polymeric dispersion for providing a cement mortar which after curing has a considerably reduced water absorption and thus an improved permanence than cement mortar manufactured in the conventional way.

A fresh cement based binding agent mixture (cement mortar or concrete mass) consists of solid particles (aggregate), water and air. A cement-bound concrete substantially consists of about 1 volume part of cement, 2 parts of water and 6,5 parts of aggregate; in addition to this there will be 50 l air in about 1000 l of fresh concrete mass. The cement particles react with a part of the mixing water to a hydration product which forms a mineral adhesive, the water-cement paste.

The fresh concrete or mortar contains water in order to on one hand together with the cement form the chemically hardening binding agent and on the other hand give the mass the consistency and homogeneity that is required for the compaction. In most cases the water admixture is considerably larger than required for the chemical reactions even if the degree of hydration is complete.

The water that is not chemically bound, the so called free water, forms capillary pores, which are continuous at the beginning of the hydration process and at high water-cement ratios. The volume of the capillary pores is therefore influenced by the water-cement ratio and the degree of hydration. The water in the capillary pores causes shinkage and swelling of hardened concrete, mortar and cement paste at drying-out and moistening resp. The considerably smaller pores, the paste pores, are contained in the water-cement paste, which makes the principle part of the hydration products. The volume of these pores are only determined by the volume of the paste and is completely independent of the initial water-cement ratio. The paste pores are above all determining of the shrinkage.

Besides the said pores air pores are contained, which are formed at the mixing. They can be natural so called comprimation pores and intentionally added pores. The natural air pore content in concrete, which is obtained when no special measures are taken is 1.0-3.5% by volume. Intentionally created air pores can be provided in many different ways, as well mechanisms as principles are described in the literature.

During the curing a number of chemical reactions take place, at which i.a. water disappears through the capillary system. The cured concrete thus has a capillary system, which can take up water by the fact that the walls are hydrophilic. In certain cases this can be a drawback, e.g. by the fact that water in the capillaries freezes at low temperatures and causes disintegration of the concrete. This gives problems with late strength of the concrete especially in cold and moist environments and at marine applications.

It is previously known through SE-B-Nos. 7614518-4 (publ. No. 418.736), 7614519-2 (publ. No. 418.852) and 8100489-7 (publ. No. 420.595) to prepare a cement mortar with low density (1200-2000 kg/m$^2$) by adding small amounts (0.2-5%) of polymeric particles. This depends on that polymeric particles added to the mortar stabilizes air pores. The polymeric particles used contains a hydrophobic component consisting of e.g. acrylic or methacrylic monomers, styrene or butadiene and a non-ionic tenside or a hydrophilic component consisting of an ethylenically unsaturated polymerizable compound.

In the British patent specification 1.159.377 there is described a cement mortar for joining structural elements. Manufacture of concrete is not mentioned. In the cement mortar there is added alkyl acrylates having an alkyl chain of up to 18 carbons, at which ethyl acrylate is preferred. The effect of this admixture is told to be an improvement of the adhesion of the mortar.

THE OBJECT AND MOST IMPORTANT FEATURES OF THE INVENTION

The object of the present invention is to provide a cement mortar and/or a standard concrete which after curing has a considerably reduced water absorption and by that an improved permanence than cement mortar manufactured in the ordinary way. Admixture of extra air in the mortar should hereby be avoided.

This has according to the invention been achieved by the fact the cement mortar and/or the concrete calculated on the amount of cement contains 0.2-10% by weight of a polymer in dispersion form containing one or more monomers from the groups acrylic monomers, methacrylic monomers and styrene and 1-15% calculated on the total amount of monomers of a methacrylate with an aliphatic side chain of 12 or more carbons.

DESCRIPTION OF THE INVENTION

The admixture of the polymeric dispersion results in that small hydrophobic polymeric particles from the dispersion are accumulated on the walls of capillaries and pores and gives them hydrophobic properties at the same time as the capillary and pore system is stabilized ano the construction is modified. In this way the water absorption is reduced and by that the risk for damages caused by water, salt and ice crystals. Additives for reducing formation of air pores known up to now usually do not provide a reproducable capillary and pore structure, which is of great importance for the resistance of concrete.

The polymers according to the invention is manufactured by known techniques for emulsifying polymerization. In order to have a low admixture of air in the cement mortar the amount of tenside has to be kept low, preferably below 2%. In order to obtain small particle sizes a hydrophilic monomer such as acrylic acid, methacrylic acid or acrylic amide is added to the polymerized monomer mixture. These monomers tend to accumulate on the surface of the dispersion particles and stabilize the particles in this way. An appropriate amount of hydrophilic monomer is 1-10%. Combinations of hydrophilic monomers may of course also be used.

The hydrophobic part of the polymer particles consists of polymeric chains obtained by polymerization of acrylates, methacrylates, styrene and similar commersially available monomers. Particularly good results are obtained when methacrylate with a long aliphatic side chain is used. A preferred example is stearyl methacrylate, which in an amount of 1-5% or preferably 2-10% calculated on the total amount of monomers gives a considerable reduction of the water absorption and stabilization of the pore system.

EXAMPLE 1

In a 1 liter polymerization flask with a cut lid there was added 490 ml water, 1 g ammonium persulphate, 1 g sodium bisulphite as initiator system and half of a monomer mixture consisting of 40% methyl methacrylate, 50% butylacrylate, 5% acrylic acid and 5% stearyl methacrylate, together 230 ml. The polymerization was carried out under nitrogen gas, under stirring and at a temperature of 50° C. After half an hour reaction the other half of the monomer mixture was added drop by drop during half an hour. After 4 hours the reaction was completed.

Test specimens were prepared according to standard ANSI/ASTM 305-65 of cement mortar containing 1% polymer of the cement weight (calculated as dry polymer). After curing under water during 28 days strength, air content, water absorption and frost resistance were measured. The tensile strength in bending was 7.5 MPa, the compressive strength was 49.5 MPa, which should be compered to 7.4 and 43.5 MPa resp. for the same cement mortar without polymer admixture. Immersion in water resulted after 8 hours in 1.8% water absorption and after 144 hours 5.48. Corresponding values for specimens not containing polymers were 3.0% and 9.3% resp.

Three types of concrete, K 30, K 40, K 50 were manufactured according to Swedish standard BBK 79 with and without resp. polymer admixture. The frost resistance for cylindrical concrete test specimens (10 cm diameter, 5 cm height) was tested. They were placed in a plastic container so that the bottom surface of the test specimens were in contact with a 30% NaCl-solution. The specimens were exerted to cyclic temperature variations: 16 hours in −20° C. (freezer) and 8 hours at room temperature. Crack formations in the specimens were observed after the following number of cycles:

|      | normal | with polymer admixture |
|------|--------|------------------------|
| K 30 | 16     | 65                     |
| K 40 | 11     | 43                     |
| K 50 | 13     | 45                     |

EXAMPLE 2

The polymeric dispersion was the same as in example 1. Test specimens prepared with 3% dispersion (30% polymer) gave the following strength values: tensile strength in bending 7.4 MPa and compressive strength 44 MPa. The water absorption was 1.43% after hours and 4.52% after 144 hours.

EXAMPLE 3

A polymer having the monomer composition 68% styrene, 25% ethyl hexyl acrylate, 5% stearyl methacrylate and 2% acrylic acid was prepared in the corresponding way is in example 1. In this case a tenside mixture consisting of 1.5% B733 and 1% B09 from Berol Kemi AB was used. The polymerization temperature was 80° C. After 4 hours the reaction was completed. It had a dry content of 29%. Test specimens prepared in the corresponding way as in example 1 with 3% polymer dispersion calculated on the weight of the cement gave the following strength values: bending strength 7.45 and compressive strength 44.8 MPa. The water absorption was after 8 hours 2% and after 144 hours 4.94%.

EXAMPLE 4

The polymer dispersion was prepared in the same way as in example 3 with the difference that the tenside content was lowered to one fourth. Test specimens prepared as in example 1 gave the same air content as without additive, i.e., no extra air entrainment was obtained.

As a comparison tests were performed according to the examples 5 and 6 below with a polymer dispersion which did not contain stearyl methacrylate.

EXAMPLE 5

In a corresponding way as in example 1 a dispersion having the monomer composition 48% methyl methacrylate, 50% butyl acrylate and 2% acrylic acid was prepared. Besides 0.2% silicon dioxide was added. After 4 hours at 50° C. a dispersion having the dry content 28.3% was obtained. Test specimens prepared as in example 1 gave the following strength values bending strength 5.8 MPa and compressive strength 35 MPa. The water absorption was 3.2% after 8 hours and 7.9% after 144 hours.

EXAMPLE 6

In a corresponding way as in example 1 a dispersion having the monomer composition 48% methyl methacrylate, 50% butyl acrylate, 2% acrylic acid was prepared. After 4 hours at 50° C. a dispersion havng a dry content of 29% was obtained. Test specimens prepared as in example 1 gave the following values: bending strength 7.4 MPa and compressive strength 43.7 MPa. The vater absorption was 3.8% after 8 hours and 6.2% after 144 hours.

As can be seen from the two examples 5 and 6 above the water absorption was higher as compared to polymers containing stearyl methacrylate.

EXAMPLE 7

Tests have also been performed with lauryl methacrylate, at which dispersions having the following monomer composition were prepared:
(1) 42% methyl methacrylate, 52% butyl acrylate, 3% acrylic acid and 3% lauryl methacrylate.
(2) 41% methyl methacrylate, 51% butyl acrylate, 3% acrylic acid and 5% lauryl methacrylate.

The same initiating agents were used as in example 1. The dispersions were prepared in exactly the same way as in the above described examples with stearyl methacrylate.

The air content of 1:3 cement mortar (1 part of Portland cement and 3 parts of standard sand) was examined with an admixture of 3% by weight (calculated as dry polymer) of the dispersion.

|     | Air content % | Water-cement ratio | Density kg/m³ |
|-----|---------------|--------------------|----------------|
| (1) | 10.3          | 0.45               | 2098           |
|     | 13.2          | 0.50               | 2010           |
| (2) | 6.7           | 0.45               | 2185           |
|     | 9.7           | 0.50               | 2085           |

Thus it is possible to use lauryl methacrylate without tenside, but it has a certain air entraining effect, which possibly can be reduced by varying the monomer composition of the dispersion. The frost resistance was determined in the same way as in example 1 to 30 cycles.

The invention is of course not limited to the above described examples but can be varied within the scope of the claims. It is for example likly that also methacrylates having an aliphatic side chain of 13-17 and more than 18 carbons have a corresponding effect.

What we claim is:

1. A product comprising a member of the group consisting of cement mortar, concrete and mixtures of cement mortar and concrete having reduced water absorption and improved permanence and having a density of 2000-2500 kg/m$^3$, said product comprising:

0.2-10 weight % based on the weight of said product, of polymer particles in a disperse form wherein said polymer is formed from monomers consisting of at least one hydrophilic monomer selected from the group consisting of acrylic acid, methacrylic acid, and acrylic amide; and at least one hydrophobic monomer selected from the group consisting of styrene, alkyl esters of acrylic acid and alkyl esters of methacrylic acid;

wherein 1-15 weight % based on the total weight of the hydrophilic and hydrophobic monomers used is a methacrylate having an aliphatic side chain of 12 or more carbons.

2. A product according to claim 1, wherein said methacrylate is stearyl methacrylate.

3. A product according to claim 1, wherein said product contains 0.5-5% of said polymer in dispersion.

4. A product according to claim 1, wherein the polymeric dispersion contains 2-10% of said methacrylate calculated on the total monomer amount.

5. A product according to claim 1 wherein the polymer is formed from a mixture of (1) acrylic acid, methacrylic acid or acrylamide, (2) a one to eight carbon alkyl methacrylate or styrene, and (3) an alkyl acrylate having one to eight carbon atoms.

6. Product according to claim 1 wherein the polymer is formed from a mixture of (1) acrylic acid, (2) styrene or methyl methacrylate, and (3) butylacrylate or ethyl hexyl acrylate.

7. A product according to claim 1 wherein said aliphatic side chain of said methacrylate is 12 to 18 carbons.

8. Method of manufacturing a product comprising a member of the group consisting of cement mortar, concrete and mixtures of cement mortar and concrete having reduced water absorption and improved permanence and having a density of 2000-2500 kg/m$^3$, comprising the steps of:

preparing said product by standard techniques;

adding to said product 0.2-10 weight %, based on the weight of said product, of polymer particles in a disperse form wherein said polymer is formed from monomers consisting of at least one hydrophilic monomer selected from the group consisting of acrylic acid, methacrylic acid, and acrylic amide; and at least one hydrophobic monomer selected from the group consisting of styrene, alkyl esters of acrylic acid and alkyl esters of methacrylic acid wherein 1-15% by weight of said hydrophilic and hydrophobic monomers is a methacrylate having an aliphatic side chain of 12 or more carbons.

9. Method of manufacturing a product as claimed in claim 8 wherein said aliphatic side chain of said methacrylate is 12 to 18 carbons.

* * * * *